United States Patent [19]

Ridenour et al.

[11] 3,880,780

[45] Apr. 29, 1975

[54] HIGH RESILIENT POLYURETHANE FOAM

[75] Inventors: Williard L. Ridenour, Madison; Robert D. McAree, Oxford, both of Conn.

[73] Assignee: Olin Corporation, New Haven, Conn.

[22] Filed: Sept. 23, 1974

[21] Appl. No.: 508,549

Related U.S. Application Data

[63] Continuation-in-part of Ser. No. 348,292, April 5, 1973, abandoned.

[52] U.S. Cl.. 260/2.5 AM; 260/2.5 AP; 260/2.5 AT
[51] Int. Cl............... C08g 22/46; C08g 22/06
[58] Field of Search.... 260/2.5 AP, 2.5 AT, 2.5 AM

[56] References Cited
UNITED STATES PATENTS

| | | | |
|---|---|---|---|
| 3,336,242 | 8/1967 | Hampson | 260/2.5 AP |
| 3,637,536 | 1/1972 | Ring | 260/2.5 AP |
| 3,738,947 | 6/1973 | Fishbein | 260/2.5 AM |
| 3,738,953 | 6/1973 | Anorga | 260/2.5 AJ |
| 3,741,917 | 6/1973 | Morehouse | 260/2.5 AP |
| 3,775,350 | 11/1973 | Jonas | 260/2.5 AP |
| 3,801,518 | 4/1974 | Irwin | 260/2.5 AT |
| 3,826,763 | 7/1974 | Lamplug | 260/2.5 AM |

*Primary Examiner*—Donald E. Czaja
*Assistant Examiner*—C. Warren Ivy
*Attorney, Agent, or Firm*—F. A. Iskander; T. P. O'Day

[57] ABSTRACT

Flexible polyurethane foam having a combination of desirable physical properties is prepared from a select formulation comprising an oxypropylated, oxyethylated triol, a select polyisocyanate mixture, and an aromatic amine curing agent. The resulting foam is of utility in various cushioning applications including the production of automotive seats.

12 Claims, No Drawings

HIGH RESILIENT POLYURETHANE FOAM

This application is a continuation-in-part of copending U.S. application Ser. No. 348,292, filed Apr. 5, 1973, now abandoned.

This invention relates to a polyether polyurethane foam and to a method for its preparation. More particularly, the invention relates to a select flexible polyurethane foam composition having improved physical properties.

It is known to prepare flexible polyurethane foams by the reaction of a polyether polyol with an organic polyisocyanate. A variety of polyether polyols have been recognized in the art as being of utility in this type of a reaction. These include the condensation products of a polyhydric alcohol and one or more alkylene oxides. See for example U.S. Pat. Nos. 3,461,086; 3,535,307; 3,336,242 and 3,738,953. The reaction of such polyether polyols with an organic polyisocyanate or mixture of polyisocyanates is generally carried out in the presence of various reaction catalysts and foaming agents. Optionally additional ingredients, such as a surfactant and/or a curing agent, may be incorporated in the reaction mixture in order to impart certain properties to the foam.

Due to the expanding uses of flexible polyurethane foams in cushioning applications, there have been several recent attempts in the art to improve the physical properties of these foams. Particularly sought after are high resilient foams having a combination of properties including tensile and tear strength, relatively low density, high ball drop resilience and a high SAC factor. Such a combination of properties, if attainable without the use of fillers and other expendients which would add to the cost of the foam or might alter its basic cellular integrity, is highly desirable in the production of automotive seats which meet the rigid requirements of the industry.

Now, in accordance with this invention, a novel polyurethane foam composition has been found which is prepared from a reaction mixture comprising (a) a select polyether polyol, (b) a select organic polyisocyanate mixture, and (c) an aromatic amine curing agent. Polyurethane foams derived from such a reaction mixture have been found to possess a combination of desirable physical properties including those mentioned above, and therefore they are eminently suitable for making automotive seats and other cushioning products.

More in detail, in preparing the polyether polyurethane foams of the invention, a polyether triol is employed which is characterized by (1) a molecular weight of at least about 4,400 (2) a trifunctional alcohol nucleus, (3) polyoxypropylene chain segments attached through one end thereof to the nucleus and (4) polyoxyethylene chain segments attached at one end thereof to the polyoxypropylene chain segments, with the proviso that the resulting polyether contains no less than 60 percent of primary hydroxyl groups. This polyether can be prepared by methods generally well known in the art wherein a trifunctional alcohol initiator is sequentially condensed, in the presence of an oxyalkylation catalyst, first with propylene oxide and then with ethylene oxide.

The alcohol initiator used in preparing the polyether triol can be any compound having three hydroxyl terminal groups. However, the aliphatic triols are preferred, particularly those containing 3–12 carbons. Illustrative are glycerol, trimethylolpropane, triethylolpropane, 1,3,5-hexanetriol, 1,2,6-hexanetriol, 1,4,6-octanetriol, and 1,5,10-dodecane triol. In accordance with the most preferred embodiment of the invention, aliphatic triols having 3–6 carbon atoms are employed such as glycerol and trimethylolpropane.

Conventional oxyalkylation catalysts are used in preparing the polyether triol. In order to achieve the requisite high molecular weight in the polyether triol, a basic catalyst is ordinarily required such as potassium hydroxide or sodium hydroxide.

While as indicated above any polyether triol, as described above, may be employed in preparing the polyurethane foams of the invention, it is preferred to use those polyether triols which have a molecular weight of about 4,500–7,000 and still more preferably about 5,500–6,800. It is also preferred that the polyether polyol contain at least about 64 percent and still more preferably about 65–85 percent, of primary hydroxyl groups.

The polyurethane foam is prepared according to the process of the invention by reacting a polyether triol as described above with a select organic polyisocyanate mixture in the presence of a reaction catalyst, a foaming agent and an aromatic amine curing agent. Either the one-shot method or the so-called "prepolymer technique" may be employed to carry out the process of the invention. However, the one-shot method is preferred.

The polyisocyanate mixture used in preparing the polyurethane foam is made up of (1) toluene diisocyanate and (2) a polymeric isocyanate, in a weight ratio, (1):(2), from about 80:20 to about 96:4 and preferably from about 85:15 to about 94:6. This weight ratio is essential, according to the invention, for obtaining a foam which has good strength properties while at the same time not being undesirably soft. In the most preferred embodiment of the invention, the weight ratio of toluene diisocyanate to the polymeric isocyanate ranges from about 87:13 to about 92:8. The ratio of NCO to OH groups, in the foam forming reaction mixture, multiplied by 100 is referred to as the "index."

The toluene diisocyanate can be any commercially available isomer or isomer mixture which is suitable in making polyurethane foam. This includes, for example, the 80/20 and the 65/35 mixtures of 2,4/2,6 isomers. By the same token, the polymeric isocyanate which is employed according to the invention can be any such material. Illustrative are the polymethylene polyphenylisocyanates which have a functionability ranging from about 2.2 to about 3.2 and which may be purchased commercially under the trademark "PAPI." Further illustration of these polymeric isocyanates is provided in U.S. Pat. No. 2,683,730, the entire disclosure of which is incorporated by reference herein.

The amount of polyisocyanate mixture that is employed should generally be sufficient to provide at least 0.7 NCO group per hydroxyl group in the reaction system, which includes the polyether triol as well as any additional material and/or foaming agent present in the system. In practice such a proportion of polyisocyanate mixture is employed as to provide no more than about 1.25, and preferably about 0.9–1.15 NCO groups per each hydroxyl group in the reaction system.

The polyurethane foams of the invention are prepared in the presence of an aromatic amine curing agent. Any such material, or a mixture thereof, which is effective in accelerating the curing rate of the polyurethane foam may be used for this purpose. Illustrative are the aromatic primary diamines which may be halogen-containing or halogen-free such as phenylene diamine, tolylene diamine, xylene diamine, 2,3'-dichlorobenzidine, 3,3-dichloro-4,4'-biphenyl diamine, and the chlorinated methylene-bridged aromatic diamines such as 4,4'-methylene-bis(2-chloroaniline). The most preferred curing agents are the methylene-bridged aromatic primary diamines such as 4,4'-methylene-bis(2-chloroaniline), which is commonly referred to in the art as "MOCA," and mixtures of such amines as may be purchased commercially under the trademark "Curene."

While any suitable additive amount of the curing agent may generally be used, it is preferred to employ relatively small amounts such as about 0.5–4.5 and preferably about 1–4.0, parts per 100 parts by weight of the polyether triol. This is because it has been found, in accordance with the invention, that higher amounts of the curing agent will result in a foam having relatively poor overall physical properties; whereas using amounts below the limits set forth above may result in a relatively soft as well as slow-curing foam. According to the most preferred embodiment of the invention, the curing agent is used in a proportion of about 1.6–2.4 parts per 100 parts by weight of the polyether triol.

In preparing the polyurethane foams of the invention any suitable foaming agent, or mixture of foaming agents, may be employed. These include inorganic foaming agents such as water and organic foaming agents containing up to seven carbon atoms such as the halogenated hydrocarbons and the low molecular weight alkanes, alkenes, and ethers. Illustrative organic foaming agents include monofluorotrichloromethane, dichlorofluoromethane, dichlorodifluoromethane, 1,1,2-trichloro-1,2,2-trifluoroethane, methylene chloride, chloroform, carbon tetrachloride, methane, ethane, ethylene, propylene, hexane, ethyl ether and diisopropyl ether. Water and the low molecular weight polyhalogenated alkanes, such as monofluorotrichloromethane and dichlorodifluoromethane, are preferred. The amount of foaming agent may be varied within a reasonably wide range as is well known in the art. Generally however, the halogenated alkanes, for example, are employed in an amount of about 2–25, parts per 100 parts by weight of the polyether triol which is used in making the foam; and water is employed in an amount of about 1–6, and preferably about 1.5–4.5, parts per 100 parts of polyether triol.

The polyurethane foams of the invention are prepared in the presence of a catalytic amount of a reaction catalyst. The catalyst employed may be any of the catalysts known to be useful for this purpose, or mixtures thereof, including tertiary amines and metallic salts, particularly stannous salts. Typical tertiary amines include, but are not limited to, the following: N-methyl morpholine, N-hydroxy-ethyl morpholine, triethylene diamine, triethylamine and trimethylamine. Typical metallic salts include, for example, the salts of antimony, tin and iron, e.g., dibutyltin dilaurate, stannous octoate, and the like. In accordance with a preferred embodiment of the invention, a catalyst comprised of a tertiary amine, such as triethylene diamine, is employed. Any catalytic proportion of the catalyst may be employed such as from about 0.04 to about 2.5, and preferably from about 0.05 to about 1.0 percent by weight based on the total weight of the polyether triol which is used in preparing the foam.

It is preferred in the preparation of the polyurethane foams of the invention to employ a minor amount of a polyurethane surfactant in order to further improve the cell structure of the polyurethane foam. Suitable such surfactants include the silicon-based materials which are conventionally used in the production of polyurethane foam such as the silicons and the siloxane-oxyalkylene block co-polymers, all of which are commercially available materials. Generally up to 2 parts of the siloxane copolymer or up to 0.1 parts of the silicone are employed per every 100 parts by weight of the polyether triol.

In the practice of this invention, a polyurethane foam-forming reaction mixture comprising the above-described ingredients is fed to a suitable reaction zone such as by pouring into a suitable mold or onto a moving conveyor belt where reaction proceeds. The foaming reaction is exothermic, and auxiliary heat is usually not necessary to effect the reaction, although it may be employed. After the reactants have been admixed for a period of between about 0.1 and about 20 seconds, an emulsion or "cream" forms. As the temperature increases from the reaction, gas bubbles are generated bringing about the formation of an uncured cellular gel material which usually cures fairly rapidly at room temperature. Once cured, the foam will ready for use in various cushioning applications.

Polyurethane foams prepared according to the process of the invention are characterized by a unique and highly desirable combination of physical properties. Ranging in density from about 1.8 to about 3.8, and preferably from about 2.2 to about 3.0, pounds per cubic foot, they have a SAC factor generally in excess of 2.4 and usually at least 2.7. The "SAC factor" is a measure of support provided by a cushioning material. In accordance with the test described in ASTM D-1564-64T, it is expressed as the ratio of indentation load deflection, ILD, at 65 percent to 25 percent deflection. Thus by having a SAC factor of over 2.4, the foams of the invention, while being quite flexible and soft at the surface, exhibit little or no tendency to bottom out; and this property is achieved in the foams of the invention in the absence of fillers or other expedients which might alter the basic properties of the foam.

The polyurethane foams of the invention have a markedly reduced tendency of succumbing to flex fatigue. Thus, their load bearing capacity is not subject to substantial reduction or increase from normal use in cushioning applications. In addition, these foams exhibit relatively little change in physical properties when subjected to accelerated heat or humid aging.

Furthermore, foams prepared according to the invention are characterized by good elongation, tensile and tear strength, and high ball drop resilience, i.e., over 45 percent as determined by the test described in ASTM D-1564-64T. They also exhibit a measurable degree of resistance to burning.

By virtue of the combination of desirable physical properties characterizing the polyurethane foams of the invention, these foams meet the rigid requirement set by the automotive industry for making molded auto seats. They are also of utility in numerous other cushioning applications such as in the manufacture of padding, seat cushions and the like.

The following examples are provided to illustrate the invention. In these examples, all parts and percentages are by weight unless otherwise specified.

EXAMPLE 1

A polyurethane foam was prepared from the following ingredients in the indicated proportions:

| Ingredients | Parts by Weight |
| --- | --- |
| Polyether triol [1] | 100.0 |
| Aromatic primary diamine curing agent [2] | 2.0 |
| Water | 3.0 |
| Amine catalyst [3] | 0.5 |
| Surfactant [4] | 0.04 |
| Polyisocyanate mixture [5] (105 index) | 37.5 |

1. This is a polyether triol having 70 percent primary hydroxyl groups and an approximate molecular weight of 5,900. It was prepared by sequentially oxyalkylating glycerin first with 90 moles of propylene oxide and then with 15 moles of ethylene oxide.
2. This is a liquid aromatic diamine curing composition which was purchased commercially, as a product of the Anderson Development Company, under the trademark "Curene 126." It is further described as a eutectic mixture of methylene-bridged aromatic amines having a molecular weight of 252 and a specific gravity of 1.25–1.26.
3. This is another commercially obtained product sold under the trademark "Dabco 33LV" and consisting mainly of one-third triethylene diamine and two-thirds dipropylene glycol.
4. This is a polymethyl siloxane purchased commercially under the trademark "DC-200."
5. This is a mixture of 9 parts toluene diisocyanate (80/20 mixture of 2,4/2,6-isomers) and 1 part polymethylene polyphenylisocyanate. The latter is a product of the Upjohn Company, purchased under the trademark "PAPI." It is approximately a trifunctional polyisocyanate having an isocyanate content of 31.5 percent by weight and a specific gravity of 1.2.

The above mixture was hand mixed at room temperature and immediately poured into an aluminum mold which was provided with a clamped lid to prevent surface blemishes in the resulting foam and maintained within a temperature range of 140°–150°F. Foaming commenced instantly and was completed in less than 3 minutes. The resulting foam was allowed to cure at ambient temperature and thereafter subjected to various physical tests. The results of these tests are indicated in Table I below:

Table I

| | |
| --- | --- |
| Core density (lbs/cu. ft.) | 2.4 |
| Indentation load deflection (lbs. ASTM D-1564-64T) | |
| at 25 percent deflection | 27 |
| at 65 percent deflection | 81 |
| SAC factor | 3 |
| Tear strength (pli., 1 in. thick sample) | 2.5 |
| Elongation (percent) | 180 |
| Ball rebound (percent ASTM D-1564-64T) | 60 |
| Tensile strength (psi.) | 16 |

A sample of the foam, when tested for resistance to burning according to the Motor Vehicle Safety Standard Test No. 302 (MVSS 302), earned a pass or nonburning rating.

Another sample of the foam was tested for height reduction or loss after being compressed to 75 percent of its free-rise height for 22 hours at 158°F. The height loss was found to be 8 percent.

EXAMPLES 2–3

The general procedure of Example 1 was followed except that different polyether triols were used in preparing the foams. The foam of Example 2, identified as E-2, was prepared from a polyether having a molecular weight of 4,500 while a 6,500-molecular-weight polyether was used to prepare the foam of Example 3, identified as E-3. Otherwise both polyethers had 70 percent primary hydroxyl groups and were products of sequentially oxyalkylating glycerine first with propylene oxide and then with 10 moles of ethylene oxide. The physical properties of each foam were tested and the results are provided in Table II below.

COMPARISON 1

For purposes of comparison, a polyurethane foam, identified as C-1, was prepared according to the procedure of Examples 2 and 3 except that the oxypropylated, oxyethylated (with 10 moles of ethylene oxide) glycerin which was used had a molecular weight of 3,000. The physical properties of the resulting foam are provided in Table II below.

Table II

| | E-2 | E-3 | C-1 |
| --- | --- | --- | --- |
| Core density (lbs./cu. ft.) | 2.8 | 3.0 | 2.5 |
| Indentation load deflection (lbs., ASTM D-1564-64T) | | | |
| at 25 percent deflection | 30 | 30 | 25 |
| at 65 percent deflection | 83 | 90 | 66 |
| SAC factor | 2.8 | 3.0 | 2.6 |
| Tear strength (pli., 1 in. thick sample) | 1.3 | 1.7 | 1.1 |
| Elongation (percent) | 137 | 166 | 140 |
| Ball rebound (percent, ASTM D-1564-64T) | 47 | 53 | 33 |
| Tensile strength (psi) | 32 | 17 | 12 |

The data in Table II demonstrates the effect on the ball rebound and SAC factor of the foam which results from using a polyether triol which is not within the molecular weight range required according to the invention.

COMPARISON 2

This comparision is provided to demonstrate the criticality of the level of primary hydroxyl groups in the triol which is employed according to the invention. Thus the exact procedure of Example 3 was followed with one exception. This is that the polyether triol used here was a 6,500 molecular weight oxypropylated then oxyethylated (10 moles EO) glycerin having 50 percent primary hydroxyl groups. This is in contrast with the polyether triol used in Example 3 which had 70 percent primary hydroxyl groups. As a result of this slight variation, the foam completely collapsed shortly after the foaming reaction was completed. This result was also found to obtain when Comparison 2 was repeated using more than twice the proportion, i.e., 1.1 part by weight, of amine catalyst.

EXAMPLES 4–5

The general procedure of Example 1 was followed in preparing two foams identified as E-4 and E-5. Foam E-4 was prepared from a formulation which was identical to that of Example 1, while in preparing foam E-5, a different polyisocyanate mixture was used; namely, 37.5 parts of a mixture (105 index) of 8 parts of the toluene diisocyanate and 2 parts of PAPI were used. For comparison purposes, an additional foam, identified as C-3 was prepared following the same procedure with one exception. In preparing C-3, 37.5 parts of toluene diisocyanate alone (105 index) were used as contrasted with the polyisocyanate mixtures used in Examples 4–5.

Foam C-3 was found to differ substantially from E-4 and E-5 in its indentation load deflection (ILD) at 65 percent deflection. Thus, it had an ILD of 57 as compared with an ILD of 70 for E-4 and 86 for E-5.

What is claimed is:

1. A flexible one shot polyurethane foam prepared from a reaction mixture comprised of:
   a. a polyether triol having a molecular weight of at least about 4,400 and at least 60 percent of primary hydroxyl groups which is the product of sequentially oxyalkylating a trihydroxy alcohol first with propylene oxide and then with ethylene oxide,
   b. a polyisocyanate mixture of (1) toluene diisocyanate and (2) a polymethylene polyphenylisocyanate in a weight ratio, (1):(2), from about 75:25 to about 96:4, in an amount sufficient to provide from 0.7 to about 1.25 NCO groups per each hydroxyl group in the reaction mixture,
   c. a blowing agent,
   d. a reaction catalyst, and
   e. an aromatic primary diamine curing agent.

2. A polyurethane foam as claimed in claim 1 wherein said polyether triol contains about 65–85 percent of primary hydroxyl groups.

3. The polyurethane foam of claim 2 wherein said polyether triol has a molecular weight from about 4,500 to about 7,000 and said ratio in the polyisocyanate mixture is from about 85:15 to about 94:6.

4. The polyurethane foam of claim 3 wherein said curing agent is a methylene-bridged aromatic diamine and this is employed in a proportion ranging from about 1 to about 4 parts per 100 parts by weight of said polyether triol.

5. The polyurethane foam of claim 4 wherein said trifunctional alcohol is glycerin or trimethylolpropane.

6. The polyurethane foam of claim 5 wherein said curing agent is used in a proportion of about 1.6–2.4 parts per 100 parts by weight of said polyether triol.

7. The polyurethane foam of claim 6 wherein said ratio in the polyisocyanate mixture ranges from about 87:13 to about 92:8.

8. The polyurethane foam of claim 7 wherein said catalyst comprises a tertiary amine.

9. The polyurethane foam of claim 8 wherein said reaction mixture comprises a polyurethane foam surfactant.

10. The polyurethane foam of claim 9 wherein said ratio in the polyisocyanate mixture is about 90:10.

11. The polyurethane foam of claim 10 wherein said foaming agent is water.

12. The polyurethane foam of claim 11 wherein said trifunctional alcohol is glycerin and said polyether triol contains about 70 percent of primary hydroxyl groups and has a molecular weight of about 6,000.

* * * * *